Patented Dec. 23, 1930

1,786,249

UNITED STATES PATENT OFFICE

LESTER KIRSCHBRAUN, OF LEONIA, NEW JERSEY, ASSIGNOR TO FRANK L. BELKNAP, OF CHICAGO, ILLINOIS

CLEANING COMPOSITION

No Drawing. Application filed February 9, 1920, Serial No. 357,204. Renewed November 21, 1927.

This invention relates to improvements in cleaning compositions and has among its salient objects to provide a product which is particularly adapted for the cleaning or removal of spots from clothing, fabric, leather, wearing apparel, household furnishing and the like; to provide a product which can be made, if desired, relatively viscous or in a pasty form so that it will not readily spread beyond the spot to which it is applied; to provide a product which can be made from two very thin and labile liquids such as gasoline and water; to provide a product in which the constituents are emulsified and which is relatively non-volatile while in emulsified condition, but which becomes volatile when the emulsion is broken; to provide a product in which the inflammable volatile constituents will not flash or explode while in the emulsified form, but on the contrary, will burn with a slow steady flow after sufficient heat has been applied to cause it to ignite; to provide a product which can be admixed with other detergents such as soap; to provide a product which is white, clean and attractive in appearance and in effect forms a cleaning cream or paste; to provide a product in which a very substantial part thereof is water; to provide a novel process for producing such product and in general to provide improvements of the character referred to.

In carrying out the process, it is desirable that the particles of the hydrocarbon constituent be in an extremely finely divided condition and evenly dispersed through the aqueous or other liquid so that the hydro-carbon forms the internal phase and the other liquid the continuous phase of the emulsion. This can be very effectively accomplished by subjecting the mixture to pressure, as for example, by passing it through an homogenizer. The viscosity may be increased by lessening the amount of liquid forming the external phase and by the degree of dispersion of the particles obtained in the internal phase. The following illustrative run of carrying out the process may be given:

I took one third water and two thirds gasoline and first dissolved in the water an emulsifying agent which was soluble in the water, as for example, a soap having emulsifying properties. I then poured the gasoline into the water, shaking gradually until the full amount of gasoline had been mixed with the water. This produced a coarse emulsion of slight viscosity. I then took this emulsion and passed it through an homogenizer. Tests were carried out at various pressures up to 4000 lbs. and the result was that a permanent emulsion was produced which was so viscous that it was difficult to pour it out of a bottle and which was pure snow white in color and of uniform character throughout. By adding water the viscosity of this emulsion decreased and by adding gasoline during the homogenizing operation, the viscosity is increased as desired.

As heretofore stated, soap may be added to the aqueous phase to facilitate the detergent action, particularly upon such kind of dirt as is not affected by gasoline. The product made as above stated will not flash before an open flame but on the other hand, if ignited by persistent application of a flame, burns slowly without spreading and with a luminous flame.

This material can be made so pasty that it can be extruded from a tube. Instead of using gasoline other solvents such as benzol or kerosene may be treated in a like manner. This process produces a permanent product.

The term "homogenizing" or "homogenized" as used in the specification and claims may be defined as that treatment which is accomplished by well known types of homogenizers or equivalents, whereby the constituents of an emulsion are subjected to pressure and/or shearing which results in a refining action so as to make the particles more uniform and possibly of a finer size, thereby making the emulsion more permanent and stable.

I claim as my invention:

1. A homogenized cleaning composition consisting of a volatile hydrocarbon dispersed in a water vehicle with a water soluble saponaceous emulsifying agent to form a substantially permanent emulsion, the hydrocarbon forming the dispersed phase and the water and emulsifying agent the continuous phase and possessing the characteristics of having been homogenized under a pressure.

2. A homogenized cleaning composition consisting of a volatile hydrocarbon dispersed in a water vehicle with a water soluble saponaceous emulsifying agent to form a substantially permanent emulsion, the hydrocarbon forming the dispersed phase and the water and emulsifying agent the continuous phase, said composition capable of having a viscosity which will allow same to be extruded from a tube and possessing the characteristics of having been homogenized under a pressure.

3. A cleaning composition comprising a volatile hydrocarbon dispersed in a water vehicle with a water soluble saponaceous agent to form a substantially permanent stable emulsion, the hydrocarbon comprising the dispersed phase and the water and emulsifying agent the continuous phase, said composition characterized in that the particle size of said composition has been substantially reduced by homogenizing action as compared with the particle size of the original emulsion treated.

4. A cleaning composition comprising a volatile hydrocarbon dispersed in a water vehicle with a water soluble emulsifying agent, the volatile hydrocarbon forming the dispersed phase and the water and emulsifying agent the continuous phase, the particles of the dispersed phase being in such an extremely finely divided condition and so evenly dispersed through the aqueous phase as to form a stable, permanent emulsion uniform in character throughout.

LESTER KIRSCHBRAUN.